June 10, 1941.                    E. A. HARTUNG                    2,244,694
PIPE AND PIPE FLANGE TONGS
Filed March 31, 1939                   2 Sheets-Sheet 1

INVENTOR
Elvin A. Hartung
BY Johnson, Kline and Smyth
ATTORNEYS

June 10, 1941.  E. A. HARTUNG  2,244,694
PIPE AND PIPE FLANGE TONGS
Filed March 31, 1939   2 Sheets-Sheet 2
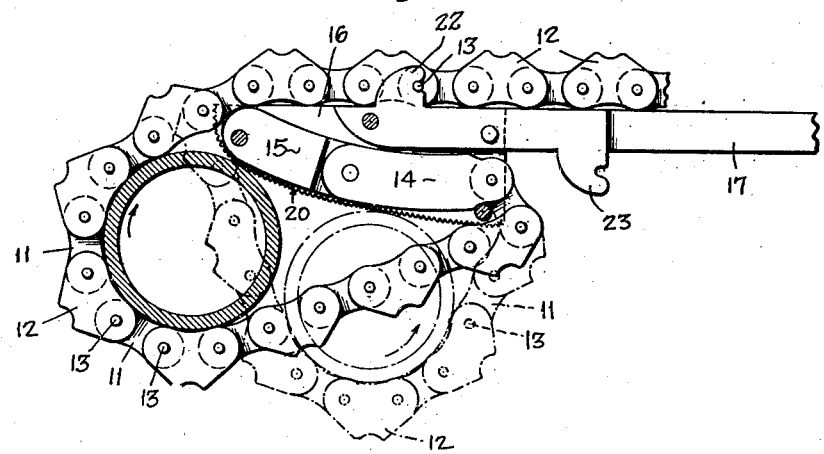
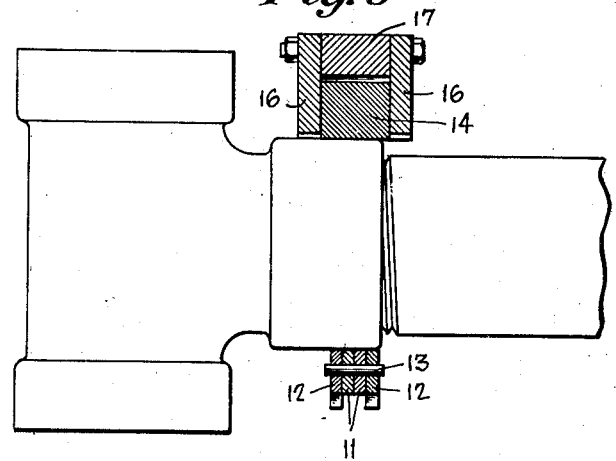
INVENTOR
*Elvin A. Hartung*
BY *Johnson, Kline and Smyth*
ATTORNEYS Patented June 10, 1941

2,244,694

UNITED STATES PATENT OFFICE 2,244,694

PIPE AND PIPE FLANGE TONGS

Elvin A. Hartung, New London, Conn.

Application March 31, 1939, Serial No. 265,079

5 Claims. (Cl. 81—68)

This invention relates to chain tongs, and, more particularly to tongs adapted for use with pipes and pipe flanges particularly those of larger sizes.

Chain tongs have been employed heretofore for putting on and taking off fittings such as flanges or the like as well as for turning the pipe itself. With the use of some of the chain tongs previously used on pipes, it has not been possible to apply both a right and left-hand turn to the pipe without changing the connection between the chain and the lever. In other tongs heretofore used, a right and left turn could be applied to the pipe if the workman were to apply the tool to the opposite side of the pipe when it was desired to apply an opposite torsional force. These prior tools have complicated installation jobs due to the fact that considerable time has been wasted in reassembling the chain when a reverse turn was to be applied to a pipe as well as where the workman had to change his position and apply the tool from the opposite side of the pipe.

One of the more important features of the present invention is the constructional arrangement of the chain and lever which permits both a right and left turn to be applied to the pipe without changing the anchorage between the chain and the lever or necessitating the workman changing the wrench to the opposite side of the pipe.

In the present invention, one end of the chain is permanently anchored to the lever, the other end being adjustably anchored and both a right and left turn can be applied to a pipe without partially disassembling the chain from the lever and without removing the wrench from the pipe. With this construction, it is merely necessary to adjust the lever so that the periphery of the pipe is engaged by different portions of the gripping jaws of the tool and then apply the force necessary to turn the pipe in the reverse direction.

In addition, the tool of the present invention may be employed on pipe flanges as a flange wrench without removing the permanently anchored end of the chain from the lever, by a slight adjustment of the chain. When it is desired to apply the tool as a flange wrench, the chain is simply reversed and the chain wrapped about the periphery of the flange, the free end being adjustably anchored to a securing means different from that used when the tool is used as a pipe wrench.

Furthermore, the chain of the present invention is so constructed that the links of the same form on one side of the chain lateral projections which straddle the flange and engage the opposite faces thereof to positively prevent the chain from laterally slipping off the flange so long as the chain is held reasonably close to the same.

The chain of the present invention is provided with a pair of pivotally interconnected blocks or solid link bars adjacent the end which are permanently anchored to the lever. These links have a width substantially equal to the distance between the adjacent faces of the jaws, and, when the tool is used as a pipe wrench, serve as filler or reinforcing blocks for the jaws of the wrench. In the situation where the tool is used as a flange wrench and the chain is reversed, the filler links are consequently also reversed and are moved from between the jaws. These link bars, when the tool is used as a flange wrench, perform as grip links and engage the periphery of the flange.

A further feature of the present invention is the ease with which the tool may be used on fittings of various types. In this situation, the tool is used as a pipe wrench, and, as the filler link bars completely fill the space between the jaws, a solid jaw is presented to the surface of the fitting engaged which prevents the wrench from slipping off the fitting as in the case of many of the wrenches heretofore proposed.

Thus, it will be seen that the present invention provides a simple implement or tool which may be used as a pipe wrench or as a wrench to quickly turn on or off pipe flanges or other fittings. The tool greatly facilitates the work of the man in the field, for the tool can be applied to either pipes or fittings without a great loss of time in changing the tool from a pipe wrench to a flange or fitting wrench.

Other features and advantages will hereinafter appear.

In the accompanying drawings:

Fig. 5 is a view similar to Fig. 4, but showing the device of the present invention mounted in position on a pipe to apply a right-hand turn to the same, the position of the pipe and chain when a left-hand turn is to be applied shown in broken lines.

Fig. 6 is a sectional view showing the device of the present invention mounted on a T fitting.

Figure 1:
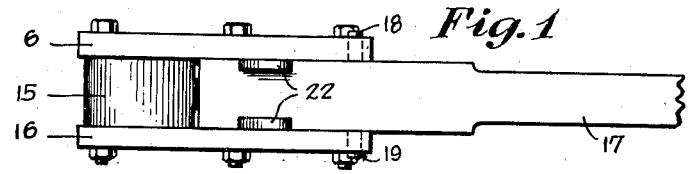
Figure 1 is a top plan view of the device of the present invention with a portion of the lever cut away.
Figure 2:
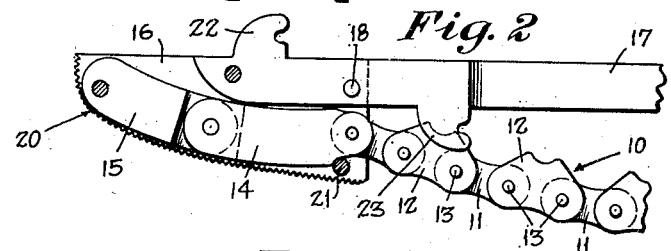
Fig. 2 is a side view of the device of the present invention with one plate removed and a portion of the lever and chain cut away.
Figure 3:
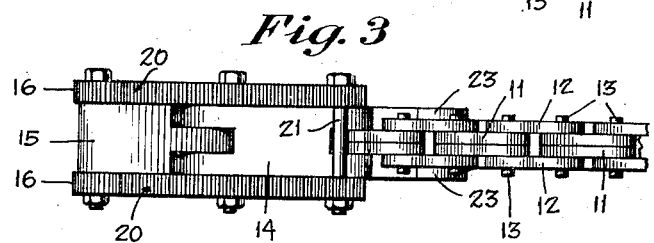
Fig. 3 is a bottom view with a portion of the lever and chain cut away.

In the preferred embodiment of the invention, a chain 10 comprising a plurality of flat central links 11 having grip surfaces on opposite sides thereof are suitably interconnected by means of side links 12 and pivot pins 13. Pivotally connected to one end of the chain 10 is a pair of block or filler link bars 14 and 15. The link bar 15, in the now preferred form of the invention, is pivotally connected between the outer ends of the plates 16 of the tool. The plates 16 are carried by a handle or lever 17 and form at one end of the lever a pair of parallel coextensive jaws. The jaws may be separately formed and then suitably secured to the end of the lever, or, if desired, may be made integral therewith.

In the invention, as illustrated and now preferred, the jaws are separately formed and secured to the lever by means of the bolt 17 and held against pivotal movement about the bolt by means of bosses 18 secured within suitable aligned apertures 19 formed in the jaws. The plates or jaws, for convenience and economy of manufacture, are identical, thereby eliminating lefts and rights and permitting the same to be interchangeable. This construction also facilitates repairing and servicing of tools in the field, for no attention need be paid to whether the jaw to be replaced is a right or left.

The marginal edge 20 of each plate, as shown, is substantially parabolic in contour and the face presented by this edge is provided with suitable serrations forming teeth extending along the entire face of each jaw. A bolt 21 passing through aligned openings formed adjacent the rear edge of each jaw is secured in place by a nut and prevents the jaws from spreading.

The wrench of the present invention is particularly adapted for use in connection with pipes and conduits of various size, and it may be used to apply both a right and left turn to the pipe without removing the tool from the pipe or reassembling the chain relative to the jaws and lever.

It will be seen, referring now to Fig. 5, that the free end of the chain may be threaded over the bolt 21 and first passed down under the pipe and then over the same and anchored to the lever by disposing the projecting ends of one of the pins 13 behind the hook or shoulder 22 formed on the lever 17.

It will be seen that an up pull may be exerted on the lever 17 which will apply a clockwise turn to the pipe when the same is engaged by the jaws, as shown in full lines in Fig. 5. If it is desired to apply a counterclockwise turn to the pipe, the jaws are adjusted so that the same engage the periphery of the pipe, as shown in broken lines in Fig. 5, and a down pull is exerted on the lever 17. It is, therefore, seen that both a right and left turn may be applied to a pipe without partially disassembling the chain or without the workman reversing his position with respect to the pipe.

In this application of the tool, the periphery of the pipe is engaged by the links of the chain as well as the jaws, the link bars 14 and 15 in this situation are not used as grip links as they do not engage or come into contact with the periphery of the pipe. The link bars 14 and 15 in this situation cooperate with the bolt 21 to form a pivotal mounting for the chain at the rear of the jaws. They also strengthen the jaws by reinforcing the same and eliminate lateral strains which might tend to cause the jaws to spread or collapse.

The tool without any adjustment may be used as a fitting wrench, and, as shown in Fig. 6, the wrench is being applied to a T fitting. The chain is disposed about the periphery of the fitting in the same manner as shown in Fig. 5 when it is applied to a pipe.

In the past, it has been difficult to work on fittings with chain tongs, particularly where the fitting was of such a size that both the jaws of the tongs could not engage the peripheral surface of the fitting simultaneously. In this situation, where only one jaw of the tongs contacted the peripheral surface of the fitting, the tong would tend to slide off the fitting in the direction of the jaw not in engagement with the fitting when force was applied to the lever.

In the tool of the present invention, however, due to the filler link bars 14 and 15, a substantially solid jaw is presented, and even though only one serrated jaw engages the surface of the fitting, the tool nevertheless will not slip off the fitting and the same may be screwed onto the pipe by an application of force against the handle which causes the chain and jaw to grip the surface of the fitting engaged. This feature of the tool of the present invention is clearly illustrated in Fig. 6, where only one jaw is shown as actually engaging the fitting but yet, as will be seen, the same can nevertheless be screwed home or removed from the pipe without the danger of the tool slipping. The tool, as it is applied to a fitting in the same manner as when it is used on pipes, may also in the application be used to apply both a clockwise as well as a counterclockwise turn without any adjustments other than that previously pointed out when the tool was described as a pipe wrench.

Figure 4:
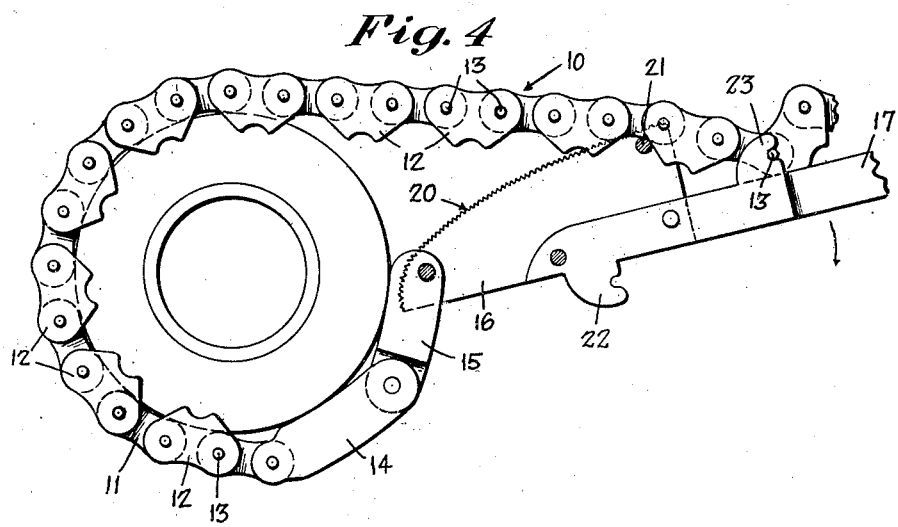
Fig. 4 is a view of the device of the present invention mounted on a flange with a portion of the lever cut away.

The tool of the present invention may also be used as a flange wrench, which installation is illustrated in Fig. 4. In this situation, the chain, if the wrench has been previously used as a pipe wrench, is threaded back over the bolt 21. The position of the wrench is then inverted and the chain disposed about the periphery of the flange, the free end of the chain being now anchored by placing the projecting ends of one of the pivot pins 13 behind the notch or shoulder 23. When the chain is threaded back over the bolt 21 and disposed about the periphery of the flange, the chain is reversed and the side engaging the peripheral surface of the flange is opposite to that which engaged the pipe when the tool was used as a pipe wrench.

The filler link bars 14 and 15 in this application, as the chain has been reversed, have been now moved from between the pair of jaws and are in engagement with the periphery of the flange. An application of force against the lever with the chain secured, as explained, will cause the chain to grip the flange and a continued force will apply a torque to the flange to screw or unscrew the same from the pipe.

It will be seen, referring again to Fig. 4, that the side links 12 are of such a configuration and so interconnected with the links 11 that the same form longitudinally of the chain transversely extending projections. These projections, when the chain is disposed about the periphery of the flange, straddle the same and engage the opposite faces of the flange and prevent the chain from slipping off the flange when a torsional force is applied by operation of the lever.

When the tool of the present invention is used as a flange wrench, it will be seen that, as the jaws have been reversed, the toothed edges thereof are not in engagement with the flange. The peripheral surface of the flange in this use of the wrench is engaged and gripped only by the chain, but, due to the leverage which is obtained, the chain so securely grips the flange that it is not necessary to augment the grip by providing jaws which would bite into the peripheral surface of the flange.

It will be understood that a force applied to the lever in the direction of the arrow of Fig. 4 will apply to the flange a clockwise torsional force and that if a counterclockwise force is desired to be applied to the flange, it is only necessary to turn the wrench over, it not being necessary to change the chain in any way.

It will be seen that the device of the present invention provides a very easily and quickly adjustable fitting and pipe wrench adapted to be used on pipes and fittings of various types of different diameters with equal facility. The advantage of being able to apply with a clockwise and counterclockwise turn to a pipe or fitting without loss of time is a real one and eliminates much of the time wasted through the use of prior tools where this has not been possible. The use of the device of the present invention also eliminates the necessity of employing several tools for use on pipes, fittings and flanges and decreasing considerably the costs of operation in the field.

Variations and modifications may be made within the scope of this invention and portions of the improvements may be used without others.

I claim:

1. In a pipe wrench of the type described, a lever; a pair of flat parallel tines arranged on opposite sides of said lever; toothed jaws formed on said tines; a plurality of interconnected link bars pivoted between said tines adjacent the free ends thereof, said bars extending rearwardly between said tines and substantially filling the space therebetween; a pin having its opposite ends supported by said tines, the free end of said link bars passing over said pin, said link bars cooperating with the toothed jaws formed on said tines to present a substantially solid jaw at one end of said lever; and a chain pivotally connected to the free end of said link bars and adapted to engage the peripheral surface of a pipe, the free end portion adjustably anchored to said lever, the chain and jaws being so formed as to apply a torsional force to the pipe in opposite directions when the lever is operated in opposite directions, said link bars and chain adapted to be threaded forwardly over said pin and passed around the periphery of a flange, the free end portion of the chain being again adjustably anchored to said lever, said link bars and chain adapted to apply a torsional force to the flange when the lever is operated.

2. In a pipe wrench of the type described, a lever; a pair of flat, spaced parallel jaws at one end thereof; a plurality of pivotally interconnected links of a width substantially equal to the distance between the said jaws having one end thereof pivotally secured to the inner faces of said jaws adjacent the free ends thereof and extending rearwardly thereof; a pin at the rear of said jaws supporting the free end of said interconnected links; and a chain comprising a plurality of links pivotally interconnected by pivot pins having one end secured to the free end of said links, said chain passed around and engaging the peripheral surface of the pipe operated on, the link connecting pivot pins of the free end portion of said chain having projecting means engageable with means carried by said lever for adjustably securing the free end portion of said chain thereto, said jaws being formed to increase the bite of said chain on the pipe and themselves to bit into the pipe as the lever is moved in a direction to turn the pipe relative to a threaded member receiving it, said link bars and chain adapted to be threaded forwardly over said pin and passed around the periphery of a flange, the projecting means of said link connecting pins being adjustably secured with means carried by said lever, said link bars and chain adapted to apply a torsional force to a flange when the lever is operated.

3. A wrench of the type described having a lever; a pair of spaced jaw members at an extremity thereof, each jaw member provided at an edge face thereof with serrations; pivotally interconnected link bars disposed between said jaw members and having one end pivotally connected to the adjacent faces of said jaw members adjacent the free ends thereof and of a width substantially equal to the distance between said jaws to reinforce the same against collapse; a chain connected to the free end of said link bars comprising a plurality of grip links adapted to be passed around the peripheral surface of a pipe, the opposite end of said chain being adjustably secured to said lever, said chain cooperable with said jaws to grip and apply a torsional force to the pipe upon a force applied to the lever; and means carried by said jaws for preventing said bars from being displaced from their position between said jaw members when a force is applied to said lever, said means permitting said bars to be displaced from their position between said jaw members and be passed with said chain around the peripheral surface of a flange, the free end of said chain being adjustably secured to said lever, said link bars and chain gripping and applying a torsional force to the flange upon a force applied to the lever.

4. In a pipe wrench of the type described, a lever; a pair of tines secured to opposite sides of said lever and projecting beyond an end thereof, the one edge face of each tine being serrated, said tines forming toothed jaws at an end of said lever; a chain comprising a plurality of grip links pivotally interconnected; a second chain of a length substantially less than the length of the first-named chain, said second chain comprising a plurality of solid links of a width substantially greater than the grip links of the said first-named chain; means for pivotally interconnecting adjacent ends of said chains; means for pivotally connecting the free end of the second-named chain to adjacent faces of said tines at the free ends thereof; and a pin having its opposite ends carried by said tines, the free end of the first-named chain being threaded over said pin and then arranged about the peripheral surface of a pipe to be operated upon, the free end of said chain being adjustably secured to said lever, the solid links of the second chain when the wrench is mounted for use on the pipe lying between said tines and completely filling the space therebetween, said solid links presenting with said toothed jaws a substantially wide surface-engaging face adapted to cooperate with the grip links of the first-named chain and apply a torsional force to the pipe upon a force being applied to the lever, said first-named chain being adapted to be threaded back over said pin to remove said second-named chain from its position between said tines whereby the two chains may be passed about the periphery of a flange, the free end of said first-named chain being adjustably secured to said lever so that a force may be applied to the lever.

5. In a wrench of the type described, a lever; a pair of flat parallel jaws arranged on opposite sides at one end of said lever; a plurality of interconnected links disposed between said jaws and of a width equal to the distance between the same, said links having one end pivotally secured to the inner faces of said jaws adjacent the free ends thereof and presenting with said spaced jaws a substantially wide flat face; means for removably holding said links between said jaws; and a chain comprising a plurality of grip links pivotally interconnected by a plurality of flanged links forming along the marginal edges of one side of said chain a plurality of spaced laterally projecting lugs, the opposite side of said chain presenting a substantially flat gripping surface, said chain being pivotally connected to the free end of said first-named links and adapted to be passed around a pipe with the flat gripping surface engaging the peripheral surface of the same, the free end of said chain being secured to said lever whereby a force applied to said lever causes said chain to cooperate with said face and apply a torsional force to said pipe, said link holding means permitting said links to be swung out from between said jaws to allow said chain to be passed around a flange with the opposite side of said chain engaging the peripheral surface of the flange, the flange links overlapping the opposite faces of the flange and preventing the chain from slipping laterally off the flange when a force is applied to the lever.

ELVIN A. HARTUNG.